A. J. & J. A. FRENCH.
Cutting Corn from Stalks.

No. 18,505.   Patented Oct. 27, 1857.

UNITED STATES PATENT OFFICE.

A. J. AND J. A. FRENCH, OF FRANKLIN, VERMONT.

IMPROVEMENT IN MACHINES FOR SEVERING EARS OF CORN FROM THE STALKS.

Specification forming part of Letters Patent No. 18,505, dated October 27, 1857.

*To all whom it may concern:*

Be it known that we, A. J. FRENCH and J. A. FRENCH, of Franklin, in the county of Franklin and State of Vermont, have invented a new and Improved Device for Cutting Ears of Corn from the Stalks and also Cutting the Stalks into Small Pieces for Fodder; and we do hereby declare that the following is a full, clear, and exact description of the same, reference being had to the annexed drawings, making a part of this specification, in which—

Figure 1:
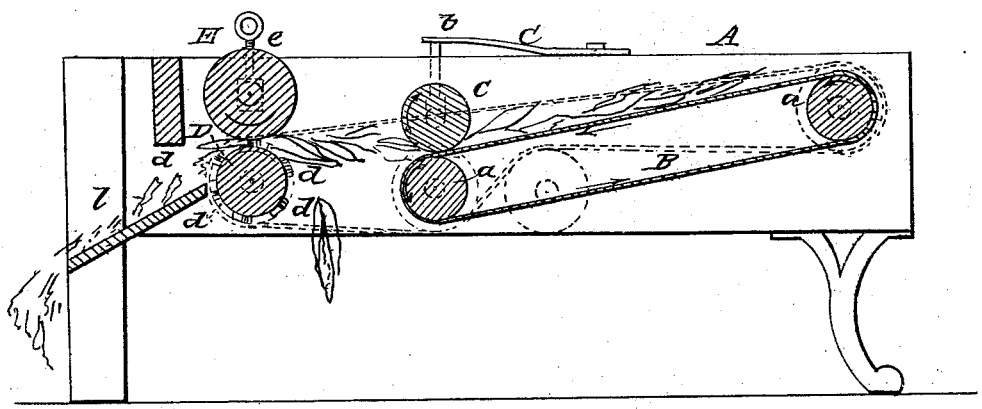
Figure 2:
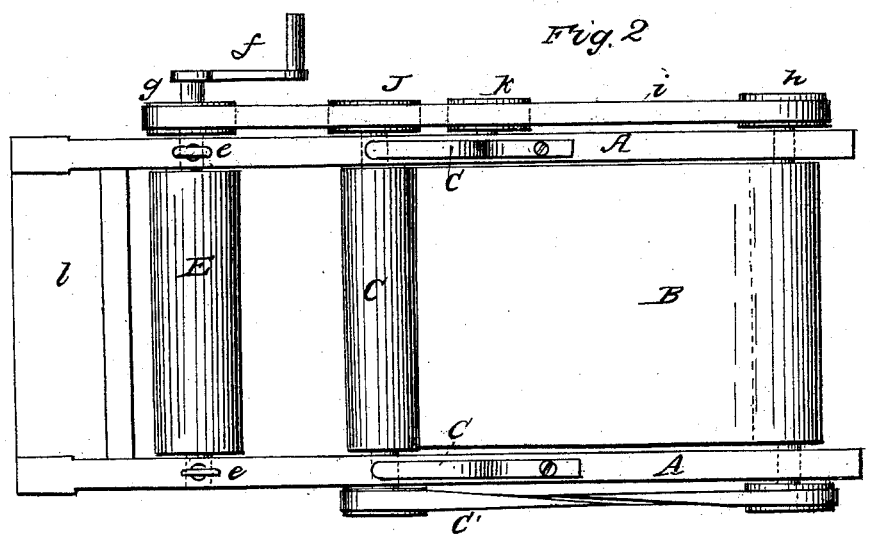

Figure 1 is a longitudinal vertical and central section of our improvement. Fig. 2 is a plan or top view of same.

Similar letters of reference indicate corresponding parts in the two figures.

This invention consists in the employment or use of an endless apron and pressure-roller which constitute a feeding device, in combination with a cutting device formed of a cylinder provided with knives and a pressure-roller, the parts being arranged, as will be hereinafter fully shown and described, whereby ears of corn may be cut from the stalks and the stalks cut into small pieces for fodder or food for stock.

To enable those skilled in the art to fully understand and construct our invention, we will proceed to describe it.

A A represent two parallel beams or side pieces, between which two rollers $a$ $a$ are placed.

B is an endless apron, which passes around the rollers $a$ $a$, the apron being slightly inclined, as shown clearly in Fig. 1. Over the depressed or inner end of the apron B a roller C is placed, the bearings of which are fitted in slots in the side pieces A A and have vertical rods $b$ resting upon them, said rods being attached to springs $c$ on the upper parts of the side pieces. The outermost roller $a$ of the endless apron and the roller C have pulleys at one end, around which a cross-belt $c'$ passes. D E represent two cylinders, which are placed between the beams or side pieces. The lower cylinder D is fitted in permanent bearings and has knives $d$ attached to its periphery, said knives extending the whole length of the cylinder D and placed a little out of parallel or obliquely with its axis. The upper roller E has its bearings fitted in slots in the beams or side pieces, a spring being placed underneath each bearing and set-screw $e$ bearing against or upon their upper ends or surfaces.

The lower cylinder D has a crank $f$ attached to one end of its axis, and also a pulley $g$, around which and a pulley $h$ on the axis of the outermost roller $a$ a belt $i$ passes, said belt being pressed up against a pulley $j$ on the innermost roller $a$ by means of a friction-roller $k$, and thereby communicating motion to said roller.

The operation is as follows: Power is applied to the lower cylinder D in any proper manner, and motion is communicated to the endless apron B and roller C by means of the belts $c$ $i'$. The apron-rollers and cylinders rotate in the direction indicated by the arrows. The stalks with the ears of corn attached are placed on the apron B butts foremost and pass underneath the roller C. This roller has a tendency to turn the ears of corn downward as the ears pass underneath it, and the stalks pass between the cylinders D E and are cut by the knives $d$ into small pieces for fodder; but the ears of corn are too large to be gripped or caught in the angle of the rollers, consequently the ears cannot pass through or between the rollers, but will be cut from the stalks by the knives $d$, the knives severing the butts or nubbins at the bases of the ears. The ears of course when cut from the stalks fall directly down, as shown in Fig. 1, and the cut stalks pass down an inclined board $l$ and fall into a proper receptacle prepared to receive them.

This machine will prove valuable to farmers on account of the numerous corn-husking machines which have lately been devised. The ears of corn require to be detached from the stalks in order that they may be properly husked by these machines. Our machine it will be seen not only effects this, but also cuts the stalks for fodder at the same time.

We are aware that endless aprons are commonly used as feeding devices and also that the two cylinders D E—one being provided with knives—are in common use for cutting straw, stalks, &c.; but we are not aware that the apron and cylinders have been combined so as to operate conjointly, as shown, for the purpose specified.

What we claim therefore as new, and desire to secure by Letters Patent, is—

The endless apron B and pressure-roller C, in combination with the cylinders D E, the cylinder D being provided with knives $d$ and the cylinder E, having a smooth periphery, the parts being arranged, as described, for the purpose set forth.

A. J. FRENCH.
      J. A. FRENCH.

Witnesses:
 D. E. SHATTUCK,
 H. TEMPLE.